May 19, 1931.  R. R. GONSETT  1,806,555
MOTOR OPERATED SHEARS
Filed Dec. 31, 1928   3 Sheets-Sheet 1
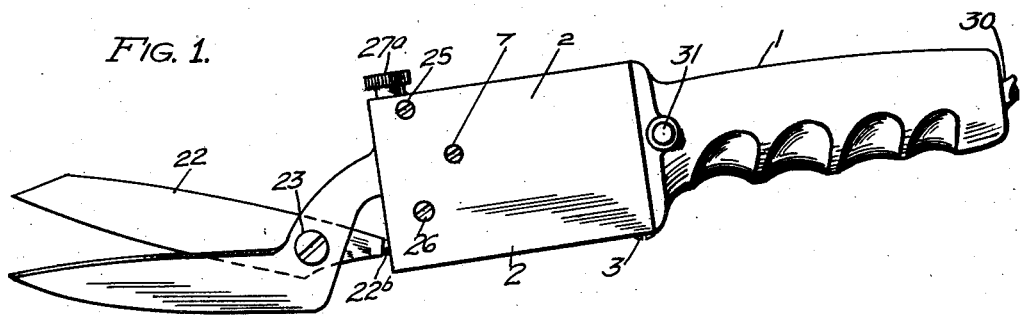
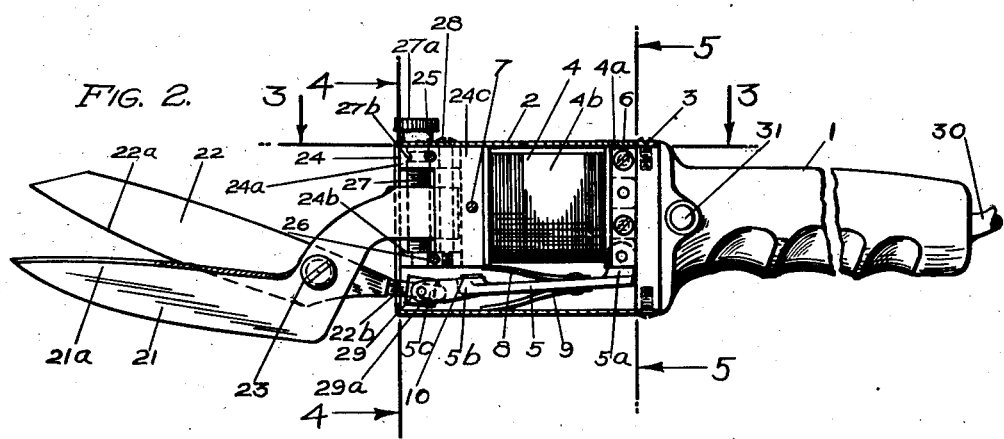
INVENTOR.
ROBERT R. GONSETT.
BY A. B. Bowman
ATTORNEY

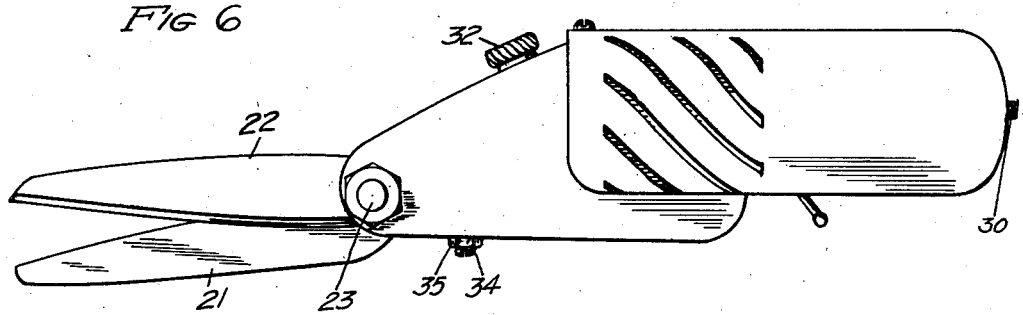
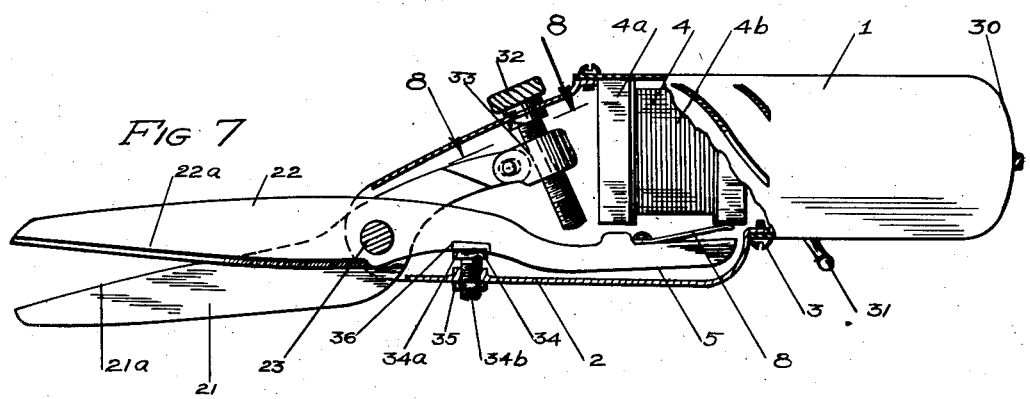
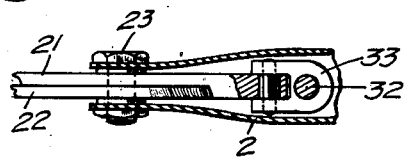
INVENTOR.
ROBERT R. GONSETT.
BY A. B. Bowman
ATTORNEY May 19, 1931.  R. R. GONSETT  1,806,555
MOTOR OPERATED SHEARS
Filed Dec. 31, 1928   3 Sheets-Sheet 3
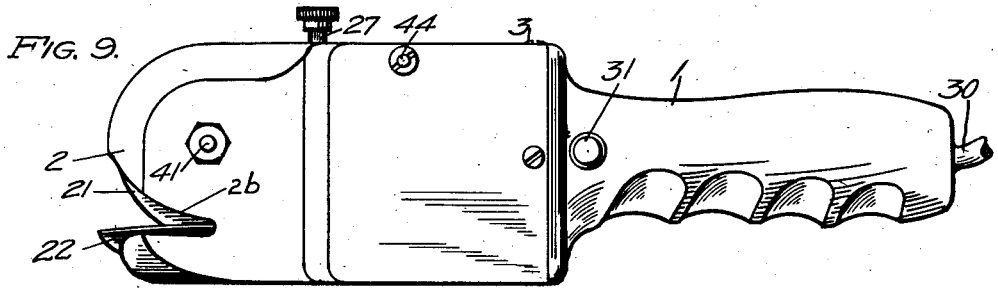
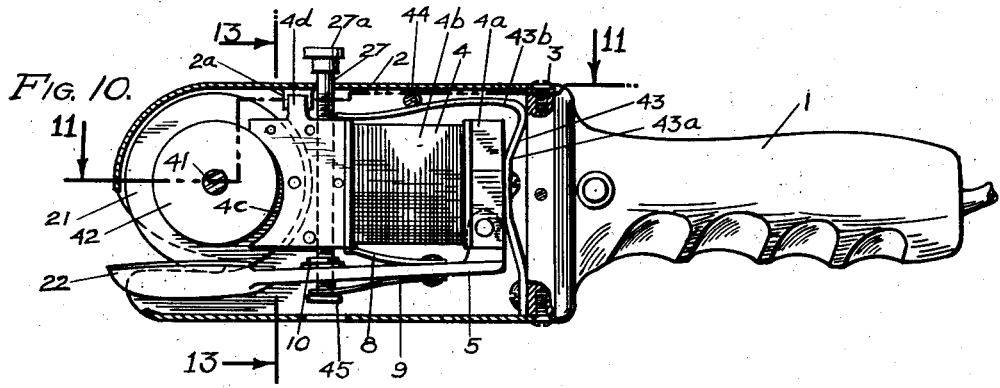
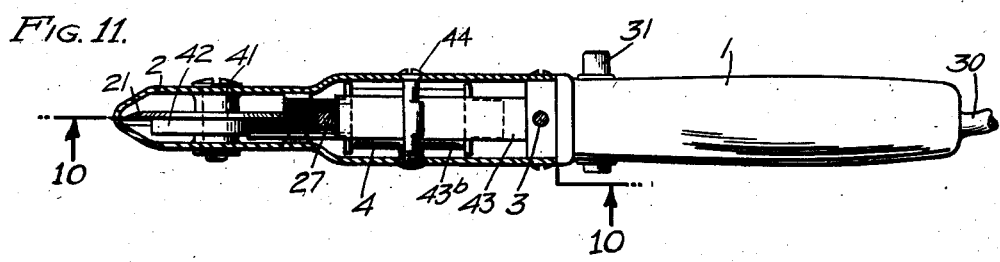
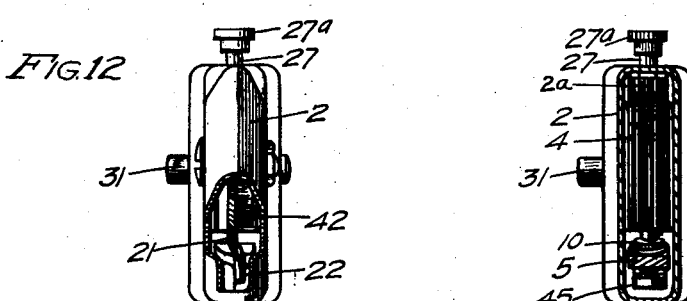
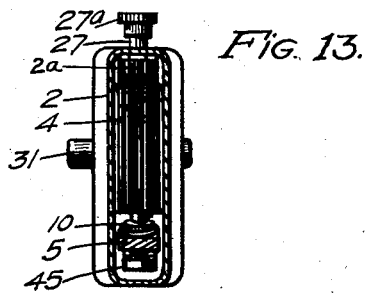
INVENTOR.
ROBERT R. GONSETT,
BY A. B. Bowman
ATTORNEY Patented May 19, 1931.

1,806,555

UNITED STATES PATENT OFFICE

ROBERT R. GONSETT, OF LOS ANGELES, CALIFORNIA

MOTOR OPERATED SHEARS

Application filed December 31, 1928. Serial No. 329,142.

My invention relates to power operated shears for hand manipulation, particularly to such shears operated by electric motors.

The objects of my present invention are: first, to provide a scissors, shears, or cutting means of this class which may be easily and efficiently controlled, guided and manipulated for cutting purposes; second, to provide means of this class which will cut smoothly and effectively either very thin or very heavy materials which are not ordinarily easy to cut with the ordinary scissors or shears; third, to provide a cutting means of this class whereby the cutting operation is effected by rapid and relatively short cutting strokes so that the cutting means may be readily guided to cut small and sharp curves and corners in the material to be cut; fourth, to provide means of this class whereby the length of the cutting stroke may be varied as desired and whereby the cutting operation may be shifted to various portions of the cutting members so as to renew the effective cutting edge temporarily, and also whereby the leverage of the cutting members may be increased or decreased as desired depending upon the weight or toughness of the material to be cut; fifth, to provide structures incorporating my invention which may be easily assembled and disassembled and in which the various parts are readily accessible and renewable; sixth, to provide novel adjusting means for a cutting means of this class; and, seventh, to provide means of this class which is novel, simple, and economical of construction, durable, easy to operate, foolproof in its operation, which is efficient and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a side view of my cutting means or shears in one form of construction, showing the same in the normal cutting position; Fig. 2 is a partial fragmentary sectional and partial side view with the sectional portion taken at 2—2 of Fig. 3, showing certain parts and portions in elevation to facilitate the illustration; Fig. 3 is a partial sectional and partial top edge and fragmentary view thereof with the sectional portion taken at 3—3 of Fig. 2; Figs. 4 and 5 are transverse sectional views thereof taken respectively through 4—4 and 5—5 of Fig. 2; Fig. 6 is a side view of my cutting means or shears in a slightly modified form of construction; Fig. 7 is a partial side and partial longitudinal sectional view thereof; Fig. 8 is a fragmentary sectional view thereof taken through 8—8 of Fig. 7; Fig. 9 is a side view of my cutting means in still another modified form of construction; Fig. 10 is a partial side and partial sectional view thereof with the sectional portion taken at 10—10 of Fig. 11; Fig. 11 is a partial top edge view and partial sectional view thereof, with the sectional portion taken at 11—11 of Fig. 10; Fig. 12 is a front elevational view thereof; and Fig. 13 is a sectional view thereof taken through 13—13 of Fig. 10.

Like characters of reference refer to similar parts and portions throughout the several views of the drawings.

In all structures shown, my cutting means, shears, or scissors, is provided with a handle 1 for holding the device by hand and for manipulating the same. To the forward end of the handle, is secured, by means of a plurality of screws 3, a casing 2. In this casing is positioned the primary operating mechanism, and thereon is supported directly or indirectly the cutting means which, as shown, consists preferably of a pair of co-acting cutting members.

The operating means shown in Figs. 1, 2, 3, 4 and 5 consists of an electric motor which consists primarily of an electromagnet 4, and an armature 5. The electromagnet 4 extends longitudinally with respect to the casing 2 and is positioned near the upper portion thereof, and consists of an iron core 4a and a wire coil 4b, the core extending beyond the opposite ends of the coil. The one end of the core may be slotted and adapted to receive in the slots, corresponding lugs at the forward end of the handle, the lugs being secured to the core by screws 6. The opposite end of the core may be supported by and secured to the casing 2 by a screw or screws 7. The armature 5 consists of a flat iron member which is provided at one end with a laterally extending lug 5a which is pivotally mounted on the end of the core 4a secured to the handle 1 and intermediate the lateral sides of the core as shown in Figs. 2 and 5. Near the free end of the armature 5 is an enlarged portion 5b which is adapted to be attracted by the forward end of the core 4a for periodically oscillating the armature about its pivotal axis. The armature is positioned between the lower edge of the electromagnet and the lower side of the casing 2. This armature is normally forced away from the forward end of the core by a leaf spring 8 which is secured to the upper side of the armature and engages the under side of the forward portion of the core. To the under side of the armature 5 is secured another spring 9 in opposed relation to the spring 8 which is adapted to absorb the shock when the free end of the armature is forced away from the forward end of the core. It will be noted that in the enlarged portion 5b of the armature is preferably provided a bumper 10 which is adapted to check the shock and the noise when the free end of the armature is attracted by and engages the core.

The cutting means or elements of the structures shown in Figs. 1 to 5 consists of a pair of shearing members 21 and 22 which are pivotally connected intermediate their ends by a bolt 23. The portions of the cutting members forwardly of their pivotal connection are shaped substantially as the portions forwardly of the pivotal connection of conventional scissors, but are preferably shorter than scissors of equal capacity. In this instance, the cutting member 21 is stationary, that is, normally stationary while the device is in operation, while the cutting member 22 oscillates back and forth about its pivotal axis relative to the cutting member 21, and the two cutting members thus cooperating are adapted to cut material placed between the same at their respective cutting edges 21a and 22a.

At the forward end of the casing 2, but within the same is provided a supporting portion 24 which, for convenience of construction, consists of a separate member removable from the casing 2. This supporting member may be secured in position to the casing by screws 25 and 26 at the upper and lower ends of the member 24 and also by the screws 7. The supporting member 24 is provided at its upper and lower ends with spaced apart supporting or bearing portions 24a and 24b which are connected by straps 24c which, as shown, fit against the lateral sides of the forward end of the core. In the portions 24a and 24b is revolubly mounted a relatively large adjusting screw 27 which extends between its supporting portions and also above the upper side of the casing and terminates at its upper end in a knob 27a for rotating the screw. This screw is retained in position by the screw 25 which extends into an annular channel 27b in the portion of the screw extending through the portion 24a. On this screw is supported the rear end of the cutting member 21 which is positioned between and adapted to be adjusted upwardly and downwardly between the supporting portions 24a and 24b by the screw 27. The extreme inner end of the cutting member 21 may be guided by the lateral portions 24c of the supporting member 24, or the same may be guided by a guide rod 28 extending vertically through the portions 24a and 24b. This guide rod, as shown, is in the form of a screw, so as to facilitate the securing of the supporting member to the casing and also the removal of the cutting member 21.

The inner end of the cutting member 22 is pivotally connected to the free end of the armature 5, imparting the oscillating motion of the armature to the cutting member 22. The pivotal connection between said members is effected by a slide block 29 which is provided at its opposite lateral sides with trunnions 29a which are pivotally mounted on furcations 5c at the extended end of the armature, the block being positioned between said furcations. This block is provided with a central hole which receives the rearwardly extended end 22b of the cutting member 22, thus slidably connecting the block with the member 22, providing a rigid slidable and pivotal connection between the cutting member 22 and the armature 5.

The motor shown and described is adapted for alternating current. When the current passes through the electromagnet, the forward ends of the core and of the armature are attracted relative to each other, causing the armature to be rotated about its pivotal axis and oscillating the cutting member 22 about its pivotal axis, causing the shearing action with the cutting member 21. During the alternation of the current, the core and armature are forced apart by the spring 8, the armature being again attracted by the forward end of the core when the current again passes through the coil after the alternation, thus repeating the cycle in rapid succession depending upon the alternations of the alternating current.

As the supported end of the cutting member 21 is adjusted downwardly by the screw 27, the pivotal axes of the cutting members are also lowered, forcing the cutting members together and causing the cutting action of the cutting members to take effect a greater distance from their pivotal connection and also increasing the cutting stroke. The latter adjustment is preferably made when cutting material of less thickness and less weight. The opposite effect takes place when adjusting the supported end of the cutting member 21 upwardly by the screw 27.

In order to remove the cutting members from the remaining portions of the structure, the screws 25, 27 and 28 are removed in the order named, permitting the cutting members to be easily removed from the supporting means and from the sliding block 29. The casing, the cutting members and the adjusting means may be removed from the remaining structure by merely removing the screws 7 and 3, leaving the electromagnet and armature supported by the handle 1.

The handle 1 is preferably hollow and is adapted to receive at its rear end the electric cable 30 which extends through the handle to a suitable switch 31 at the forward end of the handle, the switch being connected in any suitable manner to the electromagnet, the connection not being shown.

The structure shown in Figs. 6, 7 and 8 is primarily the same as that shown in Figs. 1 to 5, inclusive, and described above, the essential difference being that the connecting pivotal axes of the cutting members 21 and 22 is stationary, and that the pivot means or bolt pivotally connecting said cutting members is supported by, extended through, and secured to the forward end of the casing 2; thus the casing 2 provides a fixed and rigid pivot for the cutting members and encloses the same to beyond their pivotal axes. The forward end of the casing 2 is relatively small, the depth and thickness being only slightly larger than the corresponding dimensions of the cutting members at their pivotal axes when taken together. In this construction also the handle 1 forms a greater portion of the enclosing casing for the primary operating mechanism, and part of the casing 2 may form part of the handle.

Since the pivotal mounting of the cutting member 21 is on the casing 2, the adjusting means for the cutting members in this instance is different. The cutting means here consists of an adjusting screw 32 which is revolubly and non-shiftably mounted near its head end in the upper portion of the casing 2 and extends with its threaded portion thereinto. The screw 32 extends through an adjusting block or member 33 which is pivotally connected at its forward side to a reduced inwardly or backwardly extending portion of the cutting member 21, said pivotal connection being also slidable to provide for variations in length or distance of the pivotal connection between said members and the pivotal mounting of the cutting member 21. As the adjusting member 33 is forced downwardly, the cutting portion of the cutting member 21 is forced upwardly extending the effective cutting portions of the cutting members toward their outer ends and also lengthening their cutting strokes. The upward adjustment of the adjusting member 33 produces the opposite effect.

In the structure shown in Figs. 6, 7 and 8, the armature 5 is integrally or rigidly connected to the inner end of the cutting member 22 instead of being pivotally mounted at and on the inner end of the core of the electromagnet as in the structure described above. To the armature 5 is also secured a spring 8, which spring is secured to the inner side of the armature backwardly from its free end. The spring is spaced at its free end from the armature and engages normally the inner end of the core of the electromagnet and performs a function similar to that of the spring 8 in the structure described above.

In this construction, I have provided a positive stop for limiting the movement of the armature 5 from the electromagnet as a result of the spring 8. This positive stop consists of a screw 34 which extends through the lower side of the casing 2 with its head 34a on the inside of the casing and with its outer end threaded and slotted, as indicated by 34b. This screw is held in certain relative positions to the casing by a locknut 35 engaging the outer side of the casing. At the under side of the inwardly extending arm of the cutting member 22 is provided a yieldable bumper 36 which may be made of leather or other suitable material which engages the head of the screw 34 when the cutting members are separated.

Thus, it will be seen that the structure shown in Figs. 6, 7 and 8 is considerably simpler than that shown in Figs. 1 to 5, inclusive, but still performs similar functions.

In the modified structure shown in Figs. 9 to 13, inclusive, includes the essential elements described in connection with the structures shown in Figs. 1 to 8, inclusive, namely, the handle 1, the casing 2 secured at its rear end to the forward end of the handle by screws 3, the electromagnet 4, the armature 5, the retracting spring 8, the shock absorber 9, cutting members 21 and 22, and an adjusting screw. In this modification, however, the cutting member 21 is a cutting disc which is pivotally mounted on a spindle or a screw 41 which extends transversely through the front portion of the casing, the rapidly moving or oscillating or cutting member 22 being operatively connected with the armature 5 by preferably forming the two as an integral member, as in the structure shown in Figs. 6, 7 and 8, or the cutting member 22 as an extension beyond the free end of the structure.

The cutting member, or cutting disc 21, in this instance, is adapted to rotate periodically and to rotate small portions of a revolution simultaneously with the oscillation of the cutting member 22. Such rotation of the cutting member or disc 21 requires special mounting of the electromagnet 4 and special relation of the core thereof to the cutting member. The relation of the electromagnet with the rotating member 21, and the operation of the latter, is more specifically shown, described and claimed in my copending application for electromagnetic motors, filed in the United States Patent Office, April 14, 1928, under Serial No. 269,905.

The cutting edge of the cutting member 21 is preferably on a plane passing through the median line of the cutting device, the cutting member 21 extending to one side of this median plane while the cutting member 22 is positioned in engagement with the cutting member 21, but at the opposite side of the median line of the cutting device, the cutting member 21, preferably at the side on which the cutting member 22 is positioned, is a disc 42 which is secured to the cutting member 21. The forward end of the core 4a of the electromagnet 4 is extended a considerable distance forwardly of the wire coil 4b, but is cut away at one side to clear the cutting member, the other side of the core engaging the peripheral portion of the disc 42. The forward end of the core is provided with an arcuate cut out portion 4c into which a portion of the disc 42 extends. In this instance only the upper end or portion of the arcuate portion engages the periphery of the disc 42 and periodically imparts blows thereagainst, causing the disc and therefore the cutting member 21 to be rotated small portions of a revolution in quick succession.

In order to impart such blows against the peripheral portion of the disc 42, the electromagnet is oscillatorily mounted within the casing. Such mounting is preferably effected by securing the rear end of the core 4a to a forwardly offset portion 43a of the supporting spring 43, the one or lower end of which is secured to the forward end of the handle at the lower portion thereof. The supporting spring 43 is preferably L-shaped, the above described portions forming one leg, the other leg extending forwardly from the upper end of the former. This spring also preferably engages at the juncture of its legs, the forward end of the handle. The forwardly extended leg, designated 43b, forms a spring for normally forcing the forward end of the core against the peripheral portion of the disc. The spring leg 43b is preferably forced downwardly against the forward end of the core by a screw 44 which extends through the upper portion of the casing. This screw may be provided with a cam portion for adjusting the tension of the spring leg 43b for proportionately varying the force against the disc 42 and proportionately varying the arc of rotation of the cutting member 21.

The free end of the electromagnet may be guided vertically by a guide portion or lug 4d which extends upwardly from near its forward end between guide portions 2a within the casing, as shown best in Figs. 10 and 13.

The adjustment of the relative movements of the cutting members in this instance is made by limiting or increasing the arc of oscillation of the armature. The adjusting screw 27 is screwably mounted on a substantially vertical axis in the forward end of the core, the upper end of the screw extending beyond the casing, and the lower end extending freely through the armature and below the same, the lower end being provided with a shoulder or nut 45 which limits the downward movement of the armature. In this instance, the shock absorbing spring 9 rests against the inner side of the shoulder or nut 45 which is adjustable upwardly and downwardly by the screw. The bumper 10 in this modification is positioned around the screw but spaced therefrom and is adapted similarly to take up the shock as the armature is attracted by the electromagnet, as in the structure shown in Figs. 1 to 5, inclusive.

Thus, as current is passed through the electromagnet, the cutting member 22 is forced upwardly; between the alternations of the electric current, the armature is forced downwardly by the spring 8 and the free end of the armature momentarily upwardly slightly clearing the disc 42; when the current again passes through the electromagnet, the latter and the armature are again attracted causing the cutting member 22 to be forced upwardly and the core to impart a blow against the disc 42 causing the same to be rotated slightly, thus renewing the cutting edge of the cutting member 21 continuously. As the screw 27 is screwed downwardly, the arc of oscillation of the armature is increased causing a greater blow and longer stroke to be imparted to the cutting member 22. As the screw is adjusted upwardly, the length of the effective cutting strokes are decreased slightly.

In this construction, the cutting members are substantially wholly enclosed, but the casing is provided at its lateral sides with V-shaped cut away portions 2b permitting the materials to be cut to be placed at and between the cutting edges of the cutting members, or similarly to permit the cutting means to be drawn through the material to be cut.

Though I have shown a particular construction, combination and arrangement of parts and portions, and certain modifications thereof, I do not wish to be limited to this particular construction, combination and arrangement, nor to the modifications, but desire to include in the scope of my invention the construction, combination and arrangement substantially as set forth in the appended claims.

Having thus described my invention, what I claim as new and desire to secure by Letters Patent is:

1. In a device of the class described, a supporting means, a cutting member mounted thereon, an electromagnet supported by said supporting means, an armature in connection with said electromagnet adapted to be operated thereby, a second cutting member positioned in operative cutting relation with said first cutting member and operatively connected with said armature, and adjusting means in connection with said first cutting member for varying the length of the effective cutting stroke between the cutting members.

2. In a device of the class described, a supporting means, a cutting member movably mounted on said supporting means, an electric motor supported by said supporting means, a second cutting member shiftably mounted in operative cutting relation with the first cutting member and operatively connected to said motor and adapted to be oscillated thereby, and means in connection with the first cutting member for varying the length of the operative cutting stroke between said cutting members.

3. In a device of the class described, a handle member, a casing secured at one end to one end of said handle member, a shearing member mounted at the opposite end of said casing and extending forwardly therefrom, an electromagnet positioned within said casing between said handle member and the supported end of said shearing member, an armature pivotally mounted at one end on one end of the electromagnet and adapted to be attracted with its free end by the opposite end of said electromagnet, and a second shearing member pivotally connected intermediate its ends intermediate the ends of the first shearing member and operatively connected at its inner end to the free end of said armature.

4. In a device of the class described, a supporting means, a cutting member mounted thereon, a second cutting member in operative cutting relation with said first cutting member, operating means for actuating said second cutting member relative to the first cutting member, and adjusting means for adjusting said first cutting member relative to the other cutting member whereby the effective cutting portion between said cutting members is shifted relative to the cutting edge.

5. In a device of the class described, a supporting means, a cutting member movably mounted on said supporting means, an electric motor supported by said supporting means, a second cutting member shiftably mounted in operative cutting relation with the first cutting member and operatively connected to said motor, and means for adjusting the position of the first cutting member relative to the second cutting member.

6. In a device of the class described, a supporting means, a cutting member mounted thereon, an electromagnet supported by said supporting means, a second cutting member pivotally connected intermediate its ends relative to the first cutting member and provided at one end with an extended portion rigidly secured thereto serving as an armature and positioned in operative relation with respect to the electromagnet and adapted to be periodically attracted thereby.

7. In a device of the class described, a supporting means, a cutting member, having a pivot means intermediate its ends, mounted thereon, a second cutting member pivotally mounted intermediate its ends relative to the first cutting member, means for adjusting the position of the first cutting member, and means within the supporting means for actuating the second cutting member relative to the first cutting member.

8. In a device of the class described, means at the latter end for adjusting and holding the pivotal position of the cutting member; a supporting casing, a cutting member pivotally mounted intermediate its ends at one end of the casing and extending with one end therefrom, a second cutting member pivotally mounted intermediate its ends on the casing at the pivotal axis of the first cutting member, and an electromagnet mounted within the casing at the inner end of the second cutting member and adapted periodically to oscillate the second cutting member.

9. In a device of the class described, a supporting casing, a cutting member pivotally mounted intermediate its ends at one end of the casing and extending with one end therefrom, a second cutting member pivotally mounted intermediate its ends on the casing at the pivotal axis of the first cutting member, an electromagnet mounted within the casing at the inner end of the second cutting member and adapted periodically to attract the inner end of the second cutting member, spring means between the inner end of the second cutting member and the electromagnet for normally separating the same from each other, and a yieldable stop member within the casing adapted to be engaged by the second cutting member intermediate its pivotal axis and its inner end.

10. In a device of the class described, a supporting casing, a cutting member pivotally mounted intermediate its ends at one end of the casing and extending with one end therefrom, a second cutting member pivotally mounted intermediate its end on the casing at the pivotal axis of the first cutting member, an electromagnet mounted within the casing at the inner end of the second cutting member and adapted periodically to attract the inner end of the second cutting member, an adjusting screw mounted within the casing and extending with one end therefrom, and a nut mounted on the adjusting screw and pivotally connected with the inner end of the first cutting member.

11. In a device of the class described, a supporting casing, a cutting member pivotally mounted intermediate its ends at one end of the casing and extending with one end therefrom, a second cutting member pivotally mounted intermediate its ends on said casing at the pivotal axis of the first cutting member, an electromagnet mounted within the casing, an armature in connection with the second cutting member adapted to be attracted by said electromagnet, an adjusting screw mounted within the casing and extending with one end therefrom, and a nut mounted on the adjusting screw and pivotally connected with the inner end of the first cutting member.

12. In a device of the class described, a supporting means, a cutting member movably mounted on said supporting means, an electric motor supported by said supporting means, a second cutting member shiftably mounted in operative cutting relation with the first cutting member and operatively connected to said motor, there being provided at one end of the first cutting member an adjusting screw socket, and an adjusting screw mounted on the supporting means and extending with one end therefrom and with its opposite end into said socket for adjusting the position of the first cutting member relative to the second cutting member.

13. In a device of the class described, a supporting means, a cutting member mounted on the supporting means and extending with one end therefrom, a second cutting member pivotally mounted intermediate its ends on the forward end of the supporting means, an electro-magnet mounted on the supporting means at the inner end of the second cutting member, an armature in operative relation with the second cutting member and positioned at one side of the electro-magnet, and a spring positioned between the side of the electro-magnet and the armature for normally separating the armature from the electro-magnet.

In testimony whereof, I have hereunto set my hand at Los Angeles, California this 30th day of November 1928.

ROBERT R. GONSETT.

CERTIFICATE OF CORRECTION.

Patent No. 1,806,555.  Granted May 19, 1931, to

ROBERT R. GONSETT.

It is hereby certified that error appears in the printed specification of the above numbered patent requiring correction as follows: Page 5, line 92, claim 8, beginning with the word "means" strike out all to and including the word and semi-colon "member;"; same page and claim, line 98, after "therefrom," insert means at the latter end for adjusting and holding the pivotal position of the cutting member,; and that the said Letters Patent should be read with these corrections therein that the same may conform to the record of the case in the Patent Office.

Signed and sealed this 1st day of March, A. D. 1932.

(Seal)

M. J. Moore,
Acting Commissioner of Patents.